Patented Jan. 30, 1940

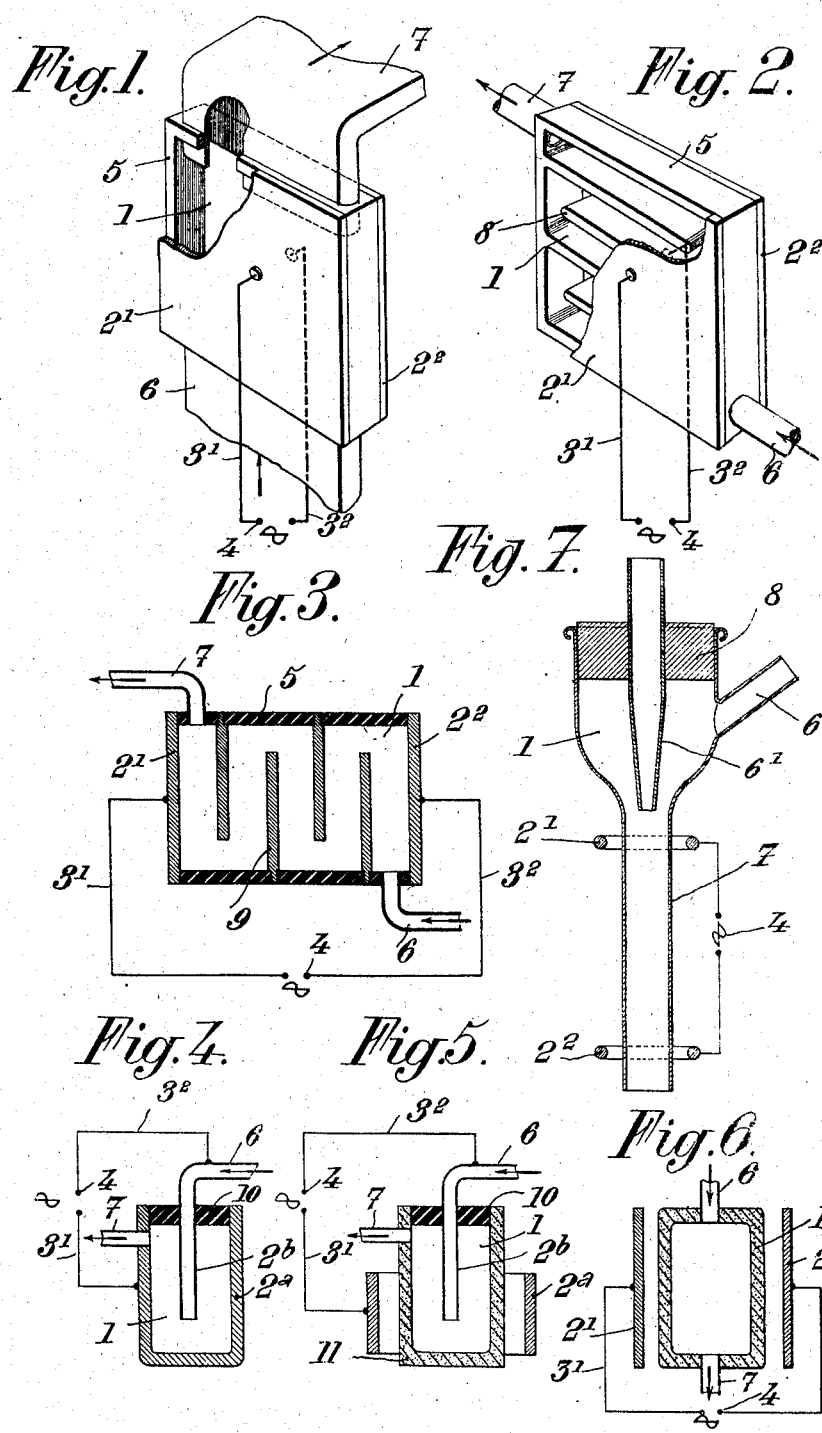

2,188,625

UNITED STATES PATENT OFFICE 2,188,625

DEVICE FOR THE HEATING OF FLOWING LIQUIDS SUCH AS RUBBER LATEX

René Alphonse Dufour, Paris, and Henri Auguste Leduc, Mantes-Gassicourt, France

Application December 16, 1937, Serial No. 180,255
In Luxemburg December 24, 1936

5 Claims. (Cl. 219—39)

The present invention relates to devices for the heating of flowing liquids, and it is more especially, although not exclusively, concerned with devices of this kind for the heating of rubber latex, with a view, for instance, to obtaining their concentration, coagulation, vulcanization, or plastification.

The chief object of the present invention is to provide a device of the kind above referred to which is better adapted to meet the requirements of practice, and in particular which is simpler and more efficient, eliminating any localized overheating which, especially in the case of latex, would produce disturbing flaking or coagulation.

According to the chief feature of the present invention, the device in question includes a vessel in which the liquid to be heated flows in a continuous manner while it is subjected to the action of an electric field, preferably of high frequency, produced between the electrodes of an electric condenser, said electrodes constituting, advantageously, part of the walls of said vessel.

According to another feature of the present invention, the vessel above referred to includes at least two means through which different matters, at least one of which is a liquid undergoing by heating a modification of its physical state, can be fed into the vessel so as to be subjected to the heating action produced therein, these matters being combined together in such manner that, when they leave the vessel, they are in the form of a piece or wire of composite structure, of any length, the cross section of which is of any shape and size as determined by the section of the outlet orifice of said vessel.

Still another feature of the present invention, relating more especially to the case in which the electrodes of the electric condenser are in contact with the liquid to be heated and are fed with alternating current of relatively low frequency, consists in providing said electrodes with means, such as scrapers, capable of removing, as they are being formed, the deposits of concentrated or partly coagulated liquid which might cover said electrodes.

Other features of the present invention will result from the following detailed description of some specific embodiments thereof.

Preferred embodiments of the present invention will be hereinafter described, with reference to the accompanying drawing, given merely by way of example, and in which:

Fig. 1 is a diagrammatic perspective view, with some parts cut away, of a first embodiment of the device according to the present invention;

Fig. 2 is a perspective view analogous to Fig. 1, showing a modification of this first embodiment of the invention;

Fig. 3 is a diagrammatic vertical section of still another modification of this first embodiment of the invention;

Fig. 4 is a diagrammatic vertical sectional view of another embodiment of the invention;

Figs. 5 and 6 are views, similar to Fig. 4, showing two different modifications, respectively, of this second embodiment of the invention;

Fig. 7 is a diagrammatic vertical sectional view of a third embodiment of the invention.

In the following description, it will be supposed that the apparatus according to the invention is for the thermic treatment of a liquid such as latex.

In the embodiment according to Figs. 1 to 3, the liquid in question is caused to flow through a vessel including two plane metallic walls, such as $2^1$ and $2^2$, of relatively large area, capable of constituting, respectively, the electrodes of an electric condenser. These walls are connected, through wires $3^1$ and $3^2$ respectively, with the terminals of alternating current source 4, the frequency of this current being preferably high, possibly as high as several millions of periods per second.

These plates are separated from each other by a frame 5, made of an insulating material, which completes the walls of vessel 1.

In the example illustrated by Fig. 1, the conduit 6 through which latex is fed to the vessel opens into the lower side of frame 5, whereas the upper side of said frame carries a conduit 7 for the outflow of said latex. Conduits 6 and 7 are given dimensions such that the fluid mass flows as uniformly as possible through the vessel, in which it is subjected to the action of the alternating electric field formed between electrodes $2^1$ and $2^2$. In the case of the liquid flowing in the direction of the arrows of Fig. 1, means, such as a pump or a tank located at a sufficient distance above the vessel, must be provided for obtaining a flow at a uniform and suitable rate of the liquid mass, in order to obtain a regular and uniform heating of all the points of the mass as it flows through the electric field.

In the example of Fig. 2, the sides of frame 5 carry baffles or partitions 8, of an insulating material, through which the rate of flow, the stirring, and the duration of the passage of the liquid through vessel 1 can be increased. In this case, the inflow and the outflow of the liquid preferably take place through conduits 6 and 7 opening into the lateral sides of the vessel and in the direction of baffles 8.

It is also possible, as shown by Fig. 3, to mount on frame 5 partitions or baffles 9 constituted by metallic plates parallel to the electrodes $2^1$ and $2^2$, these plates being possibly independent of said frame so as to act as elements about which a concentration of the electric field takes place. We might also connect these plates alternately to electrodes $2^1$ and $2^2$, in such manner as to form a system analogous to a multiple electrode condenser. In this case, conduits 6 and 7 through which latex flows in and out, respectively, open also into the lateral sides of frame and are parallel to the partitions or baffles 9.

In the embodiment shown by Fig. 4, we make use of a cylindrical vessel 1 the wall $2^a$ of which is made of a metal and is connected, through a wire $3^1$, with a terminal of a source of current 4 analogous to that above mentioned. This vessel is closed by a plug 10 made of an insulating material. In the central part of this plug, we fit a metallic tube 6 through which the liquid is fed to the inside of the vessel. This tube 6 is made of a length such that its lower end $2^b$ is closed to the bottom of the vessel. Tube 6 is connected through a wire $3^2$ with the other terminal of source 4. The outflow of latex takes place through a conduit 7 communicating with the upper part of vessel 1. The system thus constituted forms an electric condenser with cylindrical electrodes $2^a$ and $2^b$ between which an alternating electric field is formed, so as to heat the liquid as it is flowing through the vessel. With such a device, it is advantageous to give tube 6 a diameter as large as possible, in order to avoid an exaggerated concentration of the electric field around said tube. However, it should be noted that the local heating that might result therefrom is compensated by the inflow of cold latex through tube 6. For the same purpose, tube 6 might be surrounded with a suitably thick layer of insulating material.

As for the examples illustrated by Figs. 2 and 3, we may provide, in the vessel, partitions or baffles, of cylindrical, horizontal or helical arrangement, and preferably made of an insulating material, so as to obtain a better stirring of the latex and to increase the length of time for which it is flowing through the vessel. We might also replace the outlet conduit 7 by a plurality of such conduits or by a single discharge orifice or overflow running along the upper edge of the vessel, leaving a sufficient annular space between vessel 11 and the support 10 of the inlet tube. On the other hand, we might reverse the direction of flow of latex by making use of tube 6 for the outflow of the heated liquid.

In the example shown by Fig. 5, we have recourse to analogous means, but in this case vessel 1 has a wall 11 made of an insulating material, such as sandstone for instance. In this example, coaxially to said vessel, we provide a metallic and cylindrical electrode $2^a$ which may be constituted by a sheet of metal, with adjoining ends or not, and which may be mounted on a support, said support being either stationary or capable of being moved axially with respect to the vessel.

In the embodiment of Fig. 6, we make use of a vessel of rectangular shape, made of an insulating material such as sandstone, inflow tubes 6 and outflow tubes 7 for the liquid communicating with this vessel. On the outside, and close to two opposed lateral walls, we provide the electrodes $2^1$ and $2^2$ intended to produce the electric field. We might also provide the electrodes opposite the end walls, and in this case the electric field would be in a direction parallel to the flow of the liquid through vessel 1. In the latter case, this vessel might be made of any horizontal section, for instance of circular-shaped horizontal section.

Of course, several devices such as shown by Fig. 1, 2, 3, or 6 may be assembled together, these devices having similar or different electric characteristics, in such manner that the latex, passing successively and in a continuous manner through these devices, may be subjected to increasing or decreasing fields, which permits of varying the rate of heating in a predetermined manner and thus obtaining more easily a constant temperature of the product flowing out from the apparatus. An analogous result is obtained with the devices of Figs. 4 and 5 by arranging several of these devices concentrically to one another. The variation of the rate of heating can also be obtained by varying the rate of flow of the liquid in a given electric field, for instance by providing throttling or braking means which oppose the free flow of the liquid.

The thermic treatment can be obtained, as the case of the effects to obtain may be, with the intervention of a pressure or a suction. In case of need, it is possible to utilize the usual arrangements for the mounting of high frequency apparatus so as to constitute a powerful reactance winding, especially close to the inlet and the outlet of liquid or between the liquid feed tank and the condenser heating device, for opposing the flow of high frequency currents in undesirable directions.

In the embodiment of Fig. 7, the heating device includes a vessel 1, which is advantageously given the shape of a bowl or cup, of glass, quartz or any other suitable matter. The central portion of the bottom of the vessel is open and is prolonged by an outlet conduit 7, along which are concentrically mounted two electrodes $2^1$ and $2^2$ (or groups of electrodes) of annular shape, connected respectively to the terminals of a source 4 of alternating current, preferably of high frequency.

At the upper part of vessel 1 and along the axis of the outlet conduit 7, we provide a nozzle $6^1$, which is preferably fitted, for instance, in a plug 8 closing vessel 1. On the other hand, the latter is fitted with an inlet conduit $6^2$, through which latex is introduced thereinto, this latex containing or not vulcanization ingredients. Through the heating action of electrodes $2^1$ and $2^2$ as above explained, this latex can be coagulated, concentrated, plastified, and even vulcanized.

Through conduit $6^1$, we introduce, for instance, a solution of viscose, cellulose acetate, or any other collodial solution capable of acquiring a plastic or solid state under the effect of the heat produced by the electrodes $2^1$ and $2^2$.

With this device, we obtain in the outlet conduit 7 a composite wire, of any desired length, the core of which consists of an inextensible thread of viscose or another collodial solution fed through nozzle $6^1$ and the envelope of which is elastic and consists of coagulated latex or rubber, these parts adhering strongly to each other. Of course, conduit 7 is made of a length sufficient in order that its lower end is stopped by the coagulated thread, in such manner that the liquid or viscous matters, introduced into the vessel, cannot escape through said conduit 7.

On the other hand, the internal transverse section of said conduit 7 determines the shape and size of the section of the thread leaving the device.

After this, we proceed to drying and, eventually, to vulcanization of the composite thread thus obtained, through the usual means or through means fed with alternating high frequency currents, as set forth in our co-pending applications.

The thread thus obtained can be utilized, for instance, for weaving belts, the rubber which covers this thread serving to ensure adhesion to the wheels and to interconnect the various threads, whereas the inextensible viscose core resists the traction stresses.

We might also, according to the invention, introduce the latex solution through the axial nozzle 6¹ and the solution of viscose or other matter having analogous properties through the lateral conduit 6², in such manner as to obtain a thread which is inextensible but is highly flexible.

Furthermore, we might introduce through the axial nozzle 6¹ a textile thread or the like which it is desired to cover with coagulated latex or rubber or even with viscose or the like, the solution of which is introduced through the lateral conduit 6², the coagulated or plastified coating thus constituting an insulating layer for the inextensible core.

In case of necessity, we might cause to pass through the axial nozzle 6¹, a textile, metallic, or other thread, of a section smaller than the orifice of said nozzle, which simultaneously delivers a solution of viscose or latex. Through the lateral conduit 6², we would admit a solution of latex or viscose, which would give a composite thread including three components having different properties.

When the core of the thread to be obtained is metallic, the metal core may constitute one of the electrodes, being connected to one of the terminals of source 4, the other electrode being constituted by a metallic tube connected to the other terminal and arranged coaxially with respect to conduit 7 and made in line with the outlet orifice of cup 1, this metallic tube being suitably insulated from said cup.

It has been found, when the electrodes of the devices above mentioned are in contact with the liquid, that they may become covered with a deposit of matters which are more or less coagulated or concentrated, for instance as a consequence of a localized or accidental overheating. The resistance in the vicinity of the electrodes is therefore considerably increased but this is not a disadvantage with high frequency currents because these currents pass, by a capacity effect, through the coating even when the latter constitutes a coherent layer of a relatively large thickness.

But this is not the case, when the heating is performed by means of lower frequency currents because the increase of the resistance might involve the stopping or at least the slowing down of the working, unless the voltage at the terminals of the source of current of the electrodes is increased. But in this case, the heating that is produced in the very resistance layer applied on the electrodes increases quickly the thickness and the compactness of the deposit, so that the electrodes are soon wholly insulated.

As the heating of latex or other colloidal solutions through low frequency currents has very important industrial and economic advantages, this application is made possible by providing the electrodes, according to the invention, with means, such as scrapers, capable of constantly removing the creamy or coagulated deposit as it forms on the active faces of these electrodes. The creamy or coagulated mass can, subsequently, be fed back to the solution, or it can be collected separately.

When the electrodes are plane and stationary, belonging to the walls of the vessel or being immersed in the mass to be heated, the movable scrapers can consist of brushes or small plates moving with a reciprocating translatory movement, a rotary movement or an oscillating movement. The electrodes might also have the shape of drums, discs, etc., either wholly or partly immersed in the mass of liquid and moving with respect to stationary scraping means.

The devices according to the present invention as above described are simple, economical, and occupy but relatively little space. They are well adapted for the continuous heating of liquids or matters which are more or less viscous and must flow in a continuous manner. In particular, such devices can be used for heating rubber latex with a view to coagulating, concentrating, vulcanizing or plastifying it, for heating oils, for distilling and polymerizing various liquids, and so on.

In a general manner, while we have, in the above description, disclosed what we deem to be practical and efficient embodiments of the present invention, it should be well understood that we do not wish to be limited thereto as there might be changes made in the arrangement, disposition, and form of the parts without departing from the principle of the present invention as comprehended within the scope of the accompanying claims.

What we claim is:

1. A device for heating a liquid which comprises, in combination, a box-shaped vessel, two parallel metallic electrodes constituted by two opposed walls of said vessel, the other walls of said vessel being made of an insulating material and forming a frame connecting said electrodes together, inlet and outlet conduits for said liquid opening into opposed parts of said frame, whereby said liquid is caused to circulate throughout said vessel between said electrodes, an alternating current source having its terminals connected to said electrodes, respectively, and baffles provided in said box for increasing the length of travel of said liquid through said box, said baffles being parallel to one another and said inlet and outlet conduits opening into said box parallelly to said baffles.

2. A device for heating a liquid which comprises, in combination, a box-shaped vessel, two parallel metallic electrodes constituted by two opposed walls of said box, the other walls of said box being made of an insulating material and forming a frame connecting together said electrodes, a plurality of baffles provided in said box at right angles to said electrodes, inlet and outlet conduits for said liquid opening into said vessel on opposed sides of said frame in directions parallel to said baffles, whereby said liquid is caused to circulate throughout said vessel between said electrodes, and an alternating current source having its terminals connected to said electrodes, respectively.

3. A device for heating a liquid which comprises, in combination, a box-shaped vessel, two parallel metallic electrodes constituted by two opposed walls of said box, the other walls of said box being made of an insulating material and forming a frame connecting said electrodes together, a plurality of metallic baffles provided in said box parallel to said electrodes, inlet and outlet conduits for said liquid opening into opposite sides of said frame in directions parallel to said baffles, whereby said liquid is caused to circulate therethrough from one electrode to the other, and a source of alternating current having its terminals connected to said electrodes, respectively.

4. A device for heating liquids comprising a vessel composed of metallic walls separated by insulating walls, liquid inlet and outlet means disposed adjacent opposite sides of said vessel, baffle means within said vessel for causing liquid to take a tortuous path between said inlet and outlet means, and means for connecting said metallic walls to a source of alternating current.

5. A device as in claim 4, said baffle means comprising plates secured to said insulating walls and spaced from each other to form a tortuous path therebetween.

RENÉ ALPHONSE DUFOUR.
HENRI AUGUSTE LEDUC.